(12) United States Patent
Yamaguchi et al.

(10) Patent No.: US 7,528,766 B2
(45) Date of Patent: May 5, 2009

(54) RADAR DEVICE FOR TRANSMITTING RADIO SIGNAL OVER ANGULAR SCANNING FIELD

(75) Inventors: Kazuhiko Yamaguchi, Gifu (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/906,977

(22) Filed: Oct. 4, 2007

(65) Prior Publication Data
US 2008/0204304 A1    Aug. 28, 2008

(30) Foreign Application Priority Data
Oct. 5, 2006   (JP) .............................. 2006-274414

(51) Int. Cl.
G01S 13/93 (2006.01)
(52) U.S. Cl. ...................................... 342/70
(58) Field of Classification Search .................... 342/70, 342/147, 158
See application file for complete search history.

(56) References Cited

U.S. PATENT DOCUMENTS 6,119,067 A * 9/2000 Kikuchi ........................ 342/70
6,700,529 B2 * 3/2004 Matsuura ...................... 342/70
7,081,847 B2 * 7/2006 Ziller et al. ................... 342/70
7,158,217 B2   1/2007 Hoashi et al.
7,230,565 B2 * 6/2007 Nakanishi et al. ............. 342/70
2008/0204304 A1 * 8/2008 Yamaguchi et al. ........... 342/70

FOREIGN PATENT DOCUMENTS

| JP | 2004-177350 | | 6/2004 |
| JP | 2005331375 | A * | 12/2005 |
| JP | 2008096112 | A * | 4/2008 |
| WO | WO 2004005958 | A1 * | 1/2004 |

* cited by examiner

Primary Examiner—Dan Pihulic
(74) Attorney, Agent, or Firm—Harness, Dickey & Pierce, PLC

(57) ABSTRACT

In a radar device installed in a vehicle for detecting a target around the vehicle, a transmitter transmits a plurality of radio signals at intervals. A scanning mechanism is arranged such that each of the plurality of radio signals is individually entered thereto. The scanning mechanism is swingable relative to the transmitter to change a direction of each of the plurality of radio signals entered thereto, thus scanning each of the plurality of radio signals over an angular scanning field. The angular scanning field is located around the vehicle. A receiver receives a plurality of reflected signals to detect intensities of the plurality of received reflected signals. At least some of the plurality of reflected signals are generated based on reflection of at least some of the plurality of radio signals from the target.

12 Claims, 10 Drawing Sheets

| VEHICLE SPEED v (km/h) | θ (deg) |
|---|---|
| v ≤ 30 | 15 |
| 30 < v ≤ 60 | 10 |
| 60 < v ≤ 110 | 8 |
| 110 < v | 6 |

T1

| ROAD TYPE | θ (deg) |
|---|---|
| URBAN ROADS | 15 |
| OTHER ROADS | 10 |
| EXPRESSWAYS | 8 |

T2

| LANE WIDTH (m) | θ (deg) |
|---|---|
| w ≤ 10 | 8 |
| 10 < w | 15 |

T3

RADAR DEVICE FOR TRANSMITTING RADIO SIGNAL OVER ANGULAR SCANNING FIELD

CROSS REFERENCE TO RELATED APPLICATIONS

This application is based on Japanese Patent Application 2006-274414 filed on Oct. 5, 2006. This application claims the benefit of priority from the Japanese Patent Application, so that the descriptions of which are all incorporated herein by reference.

FIELD OF THE INVENTION

The present invention relates to radar devices designed to transmit first radio signals over a predetermined angular scanning field around a vehicle and receive second radio waves generated by reflection of some of the first radio waves from an object.

BACKGROUND OF THE INVENTION

An example of conventional radar devices, which is disclosed in U.S. Pat. No. 7,158,217B2 corresponding to Japanese Unexamined Patent Publication No. 2004-177350, is designed to emit laser beams toward the front of a vehicle in which it is installed beforehand. The radar device is also designed to receive beams reflected from an object located in front of the vehicle and detect the location of the object based on the received beams.

Such a radar device is commonly used for alarm systems installed in a vehicle and cruise control systems installed therein. The alarm systems are operative to detect a distance between the vehicle and another one vehicle in front thereof based on the location of another one vehicle detected by the radar device and to give an alarm when the detected distance is shorter than a predetermined threshold distance. The cruise control systems are operative to automatically control the speed of the vehicle so as to maintain a desired interval while following traffic.

Specifically, a radar device disclosed in the US patent Publication and installed in a vehicle uses a rotatably driven polygon mirror to change the direction of a laser beam emitted by a laser diode, thus irradiating a plurality of laser beams over an angular scanning field. The angular scanning field is defined beforehand in the width and height of the vehicle.

When a number of reflected light beams have been sent from an object, which is located in the angular scanning field, to the radar device based on a corresponding number of the transmitted laser beams, the number of reflected light beams are received through a light receiving lens of the radar device to be detected by a photodetector thereof. The photodetector converts the intensity of each of the individual detected light beams into a voltage signal with a level equivalent to the intensity thereof.

Some of the voltage signals corresponding to some of the transmitted laser beams adjacent to each other are integrated so that an amplified voltage signal based on corresponding some of the reflected light beams from the object is obtained. This improves the sensitivity of detection of the object.

SUMMARY OF THE INVENTION

More improvement in the sensitivity of detection of objects by such a radar device requires increase in a number of the voltage signals to be integrated to thereby improve the S/N (signal-to-noise) ratio of the radar device. In order to increase in the number of the voltage signals to be accumulated, the angular scanning field is limited to become narrower.

In a predetermined number of the voltage signals corresponding to that of the laser beams transmitted over the angular scanning field to be adjacent to each other, the narrower the angular scanning field is, the more the ratio of some of the voltage signals corresponding to some of the reflected light beams from the object to the predetermined number of the voltage signals increases. This enables the S/N ratio of the radar device to increase.

However, like the radar system disclosed in the US Patent Publication, when a polygon mirror having a hexagonal cylindrical shape with six reflecting surfaces (mirrors) is used to change the direction of a laser beam emitted by a laser diode over an angular scanning field, the angular scanning field is predetermined depending on the configuration of the polygon mirror. This may make it difficult to narrow the angular scanning field, providing a limitation to the sensitivity improvement of the radar device.

In view of the background, an object of at least one aspect of the present invention is to provide radar devices, which are capable of more improving the sensitivity of detection of objects thereby.

According to one aspect of the present invention, there is provided a radar device installed in a vehicle for detecting a target around the vehicle. The radar device includes a transmitter that transmits a plurality of radio signals at intervals, a scanning mechanism arranged such that each of the plurality of radio signals is individually entered thereto. The scanning mechanism is swingable relative to the transmitter to change a direction of each of the plurality of radio signals entered thereto, thus scanning each of the plurality of radio signals over an angular scanning field, the angular scanning field being located around the vehicle. The radar device includes a receiver that receives a plurality of reflected signals to detect intensities of the plurality of received reflected signals. At least some of the plurality of reflected signals are generated based on reflection of at least some of the plurality of radio signals from the target.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
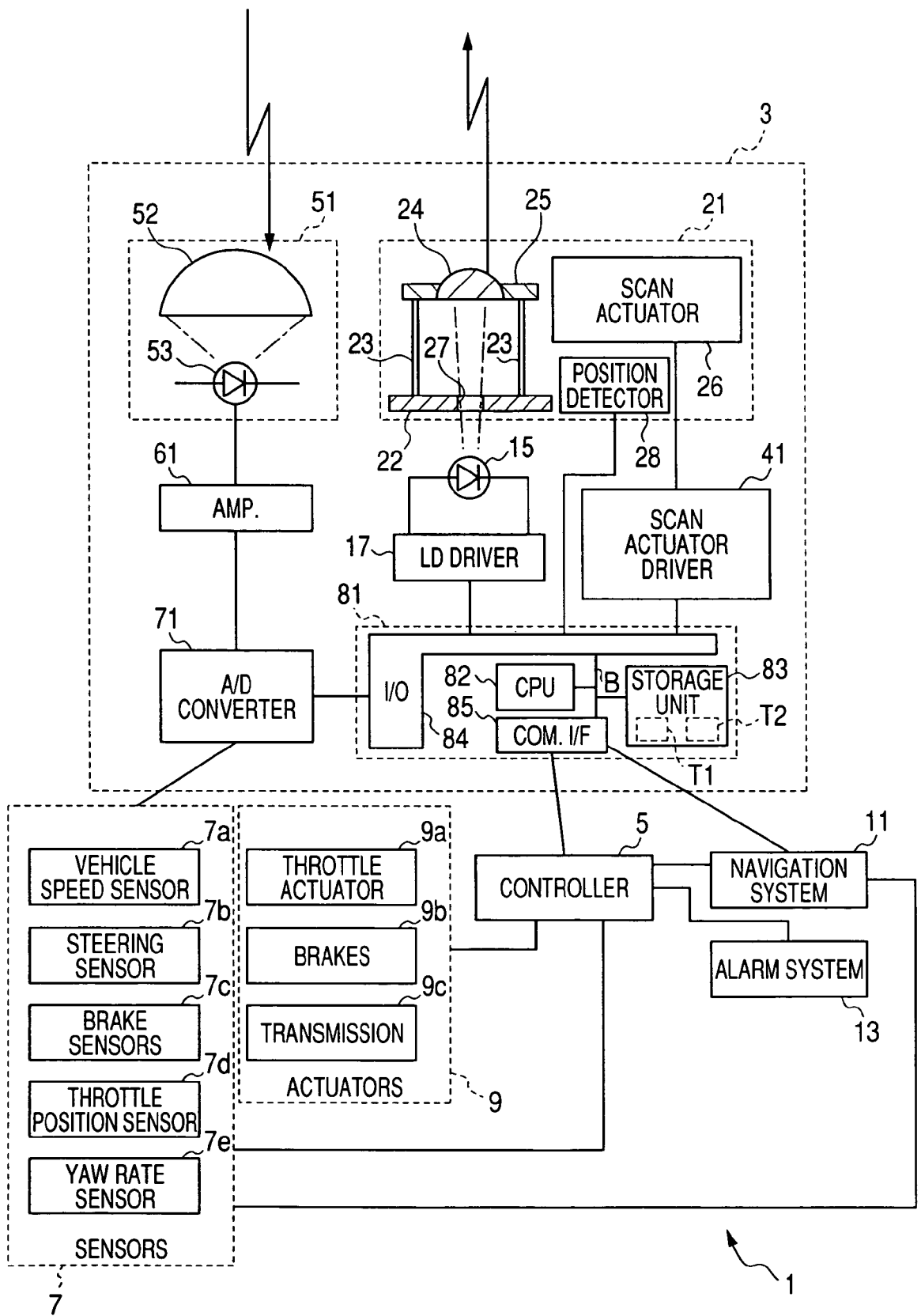
FIG. 1 is a diagram schematically illustrating an example of the overall structure of a cruise control system including a radar device according to an embodiment of the present invention.

An embodiment of the present invention will be described hereinafter with reference to the accompanying drawings. In the drawings, identical reference characters are utilized to identify identical corresponding components.

Referring to FIG. 1, an example of the structure of a cruise control system 1 installed in a vehicle V is illustrated.

Specifically, the cruise control system 1 includes a radar device 3 and a controller 5 electrically connected thereto. The radar device 3 is operative to detect a target, such as a forward vehicle, on the front side of the vehicle V and to send, to the controller 5, an electrical signal indicative of the detected target to the controller 5.

The cruise control system 1 also includes sensors 7 electrically connected to the controller 5 and operative to measure various physical quantities associated with operating conditions of the vehicle and required at least to execute the cruise control.

For example, the sensors 7 include a vehicle speed sensor 7a, a steering sensor 7b, brake sensors 7c, a throttle position sensor 7d, and a yaw rate sensor 7e.

The vehicle speed sensor 7a works to measure the speed of the vehicle V, and the steering sensor 7b works to measure a steering angle of the steered wheels of the vehicle V. Each of the brake sensors 7c is so arranged in the vehicle V as to detect the operating condition of a corresponding one of brakes for respective wheels of the vehicle. The throttle position sensor 7d works to measure a position of a throttle valve disposed in an intake pipe of an vehicle's engine to be rotatable therein, and the yaw rate sensor 7e works to measure a vehicle's turn angle around its vertical axis.

Each of the sensors 7 (7a to 7e) works to send, to the controller 5, electrical measurement signals indicative of the measured pieces of information thereby. In particular, the vehicle speed sensor 7a also works to send an electrical measurement signal indicative of the measured vehicle speed to the radar device 3.

The cruise control system 1 further includes actuators 9 electrically connected to the controller 5 and operative to convert electrical drive signals into mechanical movements of respective target devices associated with operating conditions of the vehicle and required at least to execute the cruise control.

For example, the actuators 9 include a throttle actuator 9a, brakes 9b, and an automatic transmission 9c.

The throttle actuator 9a is mechanically linked to the throttle valve and operative to rotate the throttle valve so as to control the amount of air-fuel mixture that reaches cylinders of the engine, thus controlling the speed of the vehicle V.

Each of the brakes 9b is operative to arrest the motion of a corresponding one of the wheels by means of friction, thus causing the vehicle V to slow or stop.

The automatic transmission 9c has a gear train. The automatic transmission 9c is configured to take power from the engine and control the transfer of the power to a drive shaft of the vehicle V or the wheels while changing the gear ratio of the gear train. The change of the gear ratio allows the speed of the vehicle V to be controlled.

Specifically, the controller 5 is operative to:

receive the electric measurement signals sent from the radar device 3 and the sensors 7; and execute cruise control of the vehicle V based on the received electrical measurement signals by driving the actuators 9 so as to automatically control the vehicle speed, thereby maintaining a desired interval following traffic, such as the monitored traffic in front of the vehicle V.

The cruise control system 1 includes a navigation system 11 and an alarm system 13 electrically connected to the controller 5 and the sensors 7.

The navigation system 11 is operative to receive radio signals transmitted from global positioning satellites (GPS). In addition, the navigation system 11 is operative to receive the electric measurement signals including the speed of the vehicle V and the rate of change of steering angle of the vehicle V sent from some of the sensors 7.

The navigation system 11 stores in advance an electronic map database in a storage medium, such as a DVD-ROM or Hard Disk installed therein. The electronic map database includes a plurality of electronic map images vertically representing roads and their surroundings in, for example, a selected country.

Specifically, the navigation system 11 is operative to calculate the current vehicle's exact location with the vehicle V running based on the received electric signals and the electronic map image.

The navigation system 11 is operative to display the current vehicle's exact location on the screen of a display device together with the readout electronic map image associated with the vehicle's exact location.

In addition, the navigation system 11 is operative to calculate the best route to occupant's destination from the current location according to occupant's instructions, and give an occupant(s) voice or visual guidance to the destination along the calculated best route using the display device and/or a speaker. The controller 5 is capable of using the current vehicle's exact location and the destination in executing the cruise control of the vehicle V.

The alarm system 13 is operative to detect a distance between the vehicle V and another one vehicle in front thereof based on the electric signal sent from the radar device 3 and indicative of the traffic in front of the vehicle V. The alarm system 13 is operative to give an alarm when the detected distance is shorter than a preset threshold distance.

Next, an example of the structure of the radar device 3 will be described hereinafter.

Referring to FIGS. 1, 2A, 2B, 3A, and 3B, the radar device 3 is mounted on the front end of the vehicle V and provided with a laser diode (LD) 15 as an example of light emitting devices (transmitters) and with an LD driver 17 electrically connected to the laser diode 15. The laser diode 15 is designed to be driven by the LD driver 17 to transmit a pulsed laser beam.

The radar device 3 is also provided with a scanner 21, a scan actuator driver 41, a receiver 51, an amplifier 61, an analog-to-digital (A/D) converter 71, and a controller 81.

The scanner 21 is composed of a base 22, four bar springs 23 as an example of biasing members, a convex lens 24, a lens holder 25, a scan actuator 26, and a position detector 28.

The base 22 has, for example, a substantially square plate-like shape and is formed at its center with a substantially circular through hole 27 through the thickness of the center thereof. In the embodiment, the base 22 is preferably arranged such that the through hole 27 is located at a central portion of the front end of the vehicle V, and one pair of sides thereof are located to be substantially parallel to a direction WD of width of the vehicle V.

The lens holder 25 has, for example, a substantially square plate-like shape smaller than the base 22 and is formed at its central portion with a substantially cylindrical fitting hole through the thickness of the center thereof. The lens holder 25 is arranged opposing the base 22 such that the fitting hole is aligned with the through hole 27 of the base 22.

Each of the bar springs 23 has one end and the other end. The one end of each of the bar springs 23 is joined to one corner of one major surface 25a of the lens holder 25. The other end of each of the bar springs 23 is joined to one corner of one major surface 22a of the base 22.

Specifically, the four bar springs 23 support the base 22 and the lens holder 25 in parallel to each other.

The convex lens 24 has a convex output surface 24a and an entrance surface 24b opposite thereto. The convex lens 24 is fitted in the fitting hole of the lens holder 25 such that:

the entrance surface 24b is flush with the one major surface 25a of the lens holder 25 and is opposite to the one major surface 22a of the base 22; and an optical axis CE of the convex lens 24 is directed ahead of the vehicle V.

The convex output surface 24a of the convex lens 24 has a predetermined radius of curvature previously designed to properly monitor traffic on the front side of the vehicle V.

The laser diode 15 and the convex lens 24 are arranged opposing each other across the through hole 26 such that an optical axis L of the laser beam to be output from the laser diode 15 and the optical axis CE of the convex lens 24 are aligned with the axial direction of the through hole 27 when no loads are applied to the four bar springs 23. This arrangement allows the entrance surface 24b of the convex lens 24 to face the laser diode 15 via the through hole 27, enabling the laser beam output from the laser diode 15 to enter the entrance surface 24b of the convex lens 24.

The position detector 28 consists of a light emitting diode (LED) 28a fixedly mounted on a portion of the one major surface 25a of the lens holder 25. The portion of the one major surface 25a of the lens holder 25 on which the LED 28a is fixedly mounted is located on a plane C. The plane C passes through the center of the entrance surface 24b of the convex lens 24 and through one pair of peripheral sides of the lens holder 25, and is orthogonal to the one major surface 25a thereof.

In other words, the place C is orthogonal to the width direction WD of the vehicle V and parallel to a direction of height thereof.

For example, the LED 28a is operative to emit light toward the base 22 over a predetermined cycle.

The position detector 28 also consists of a position sensitive detector (PSD) 28b disposed on the plane C such that its light-detective area is arranged opposing the LED 28a and spaced therefrom. The PSD 28b is fixedly supported by supporting members SM1, and the supporting members SM1 are fixed to the base 22. This allows the position of the PSD 28b relative to the base 22 to be unchanged.

The PSD 28b is operative to receive the light emitted from the LED 28a every predetermined cycle so as to detect a current position of the optical axis CE of the convex lens 24 in the width direction WD of the vehicle V as a current position of the convex lens 24. The PSD 28b is also operative to send a detection signal indicative of the current position of the convex lens 24 every predetermined cycle.

The scanner 21 is composed of a coil (coiled wire) 30 wound around the peripheral sides of the lens holder 25. The coil 30 is electrically connected to the scan actuator driver 41 (see FIG. 1). The scan actuator driver 41 is operative to feed an electric current with a predetermined magnitude and direction to the coil 30.

The scanner 21 is composed of a permanent magnet 31 and a yoke 32.

The yoke 32 has a substantially square annular shape with a gap. Specifically, the yoke 32 has first and second ends 32a and 32b providing the gap therebetween.

The yoke 32 is arranged such that the first and second ends 32a and 32b are opposite to each other across a portion 30a of the coil 30. The portion 30a of the coil 30 extends along one peripheral side of the lens holder 25 parallel to the plane C (the height direction) and orthogonal to the width direction WD. The first end 32a of the yoke 32 is located between the portion 30a of the coil 30 and the base 22, and the second end 32b is located opposing the first end 32a thereof across the portion 30a of the coil 30.

The permanent magnet 31 is so mounted on the second end 32b of the coil 32 as to face the portion 30a of the coil 30.

Specifically, the arrangement of the permanent magnet 31 and the one end 32a of the yoke 32 provides an air gap G therebetween, and the portion 30a of the coil 30 is located in the air gap G of the yoke 32. In the air gap G, a plurality of magnetic lines of force perpendicularly passing through the coiled wire 30 are generated in a direction shown by arrow D1, which is orthogonal to the width direction WD.

The yoke 32 is fixedly supported by a supporting member SM2, and the supporting member SM2 is fixed to the base 22. This allows the position of the yoke 32 and that of the permanent magnet 31 relative to the base 22 to be unchanged.

The coil 30, the permanent magnet 31, and the yoke 32 provide the scan actuator 26.

Figure 2A:
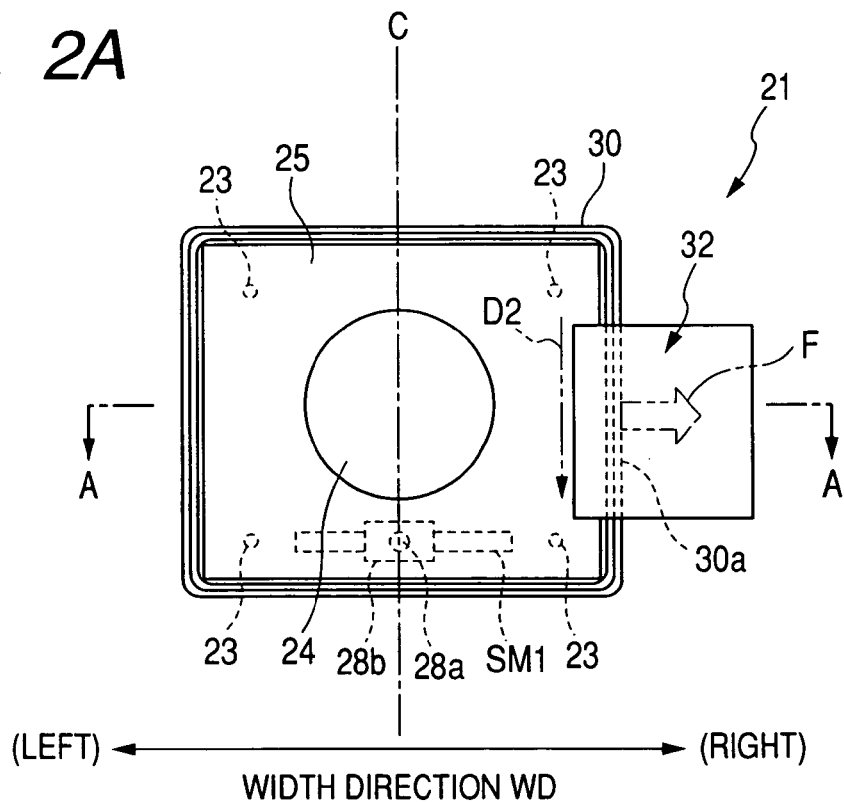
FIG. 2A is a plan view of a scanner as viewed from the forward side of a vehicle.
Figure 2B:
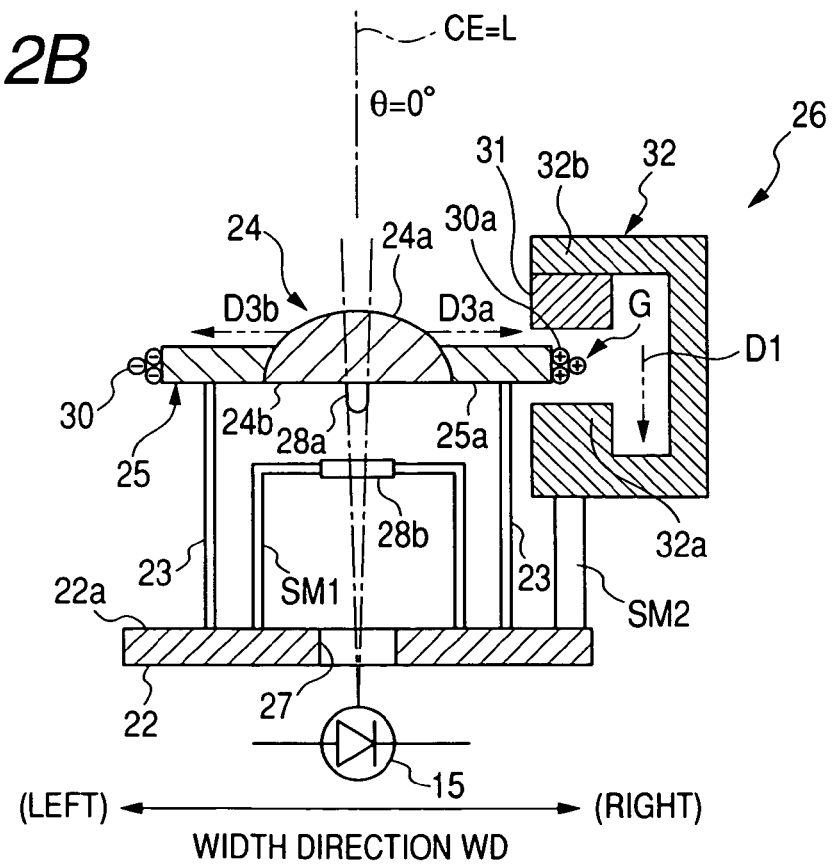
FIG. 2B is a cross sectional view taken on line A-A in FIG. 2A.

An electric current supplied from the scan actuator driver 41 to the coil 30 in a direction shown by arrow D2 allows a thrust force F to be applied to the portion 30a of the coil 30 by the Fleming's left-hand rule. Specifically, the thrust force F is orthogonal in direction to each of the magnetic field direction D1 and the current direction D2 in accordance with the Fleming's left-hand rule. The direction of the thrust force F is illustrated in FIG. 2A by arrow F, which corresponds to the right side in the width direction WD.

The thrust force F to be applied to the portion 30a of the coil 30 moves, in the direction illustrated by the arrow F toward the yoke 32, the coil 30 together with the lens holder 25 and the convex lens 24 fixed thereto.

The magnitude of the thrust force F depends on the change in the magnitude of the electric current to be supplied to the coil 30. Thus, increase and decrease in the magnitude of the electric current to be supplied to the coil 30 permit the convex lens 24 to swing close to the yoke 32 and away therefrom illustrated by arrows D3*a* and D3*b* in the width direction WD. The swing of the convex lens 24 changes its position relative to the laser diode 15 (the through hole 27).

When no electric current is supplied from the scan actuator driver 41 to the coil 30, the respective biasing forces of the bar springs 23 to be applied to the lens holder 25 allow the optical axis of the convex lens 24 to be substantially aligned with the axial direction of the through hole 27. In this alignment, the convex lens 24 is defined to be located at a default position.

Specifically, upon the convex lens 24 being located at the default position, a laser beam output from the laser diode 15 is transferred in the axial direction of the through hole 27 to enter the central portion of the entrance surface 24*b* of the convex lens 24. The laser beam entering the convex lens 24 from its entrance surface 24*b* is passed therethrough to be output from the central portion (apex portion) of the convex output surface 24*a* of the convex lens 24 in a direction parallel to the direction in which the laser beam enters the convex lens 24.

In other words, an optical axis L of the laser beam output from the laser diode 15 is aligned with that of the convex lens 24 so that a scan angle $\theta$ made by the optical axis L of the laser beam and the optical axis CE of the convex lens 24 is determined to 0 degrees.

Accordingly, the laser beam is transmitted ahead of the vehicle V.

When the convex lens 24 is located at the default position, an electric current supplied from the scan actuator driver 41 to the coil 30 in the direction shown by the arrow D2 generates a thrust force F to be applied to the portion 30*a* of the coil 30 by the Fleming's left-hand rule in the direction shown by the arrow F.

As set forth above, the thrust force F to be applied to the portion 30*a* of the coil 30 moves, in the direction D3*a* (the right in the width direction WD in FIGS. 3A and 3B), the convex lens 24 from the default position together with lens holder 25 against the biasing forces of the bar springs 23. This results in that the optical axis CE of the convex lens 24 is shifted from the axial direction of the through hole 27 in the direction D3*a* close to the yoke 32.

Because of the shift of the optical axis CE of the convex lens 24 from the axial direction of the through hole 27, a portion of the entrance surface 24*b* of the convex lens 24 into which the laser beam output from the laser diode 15 is input is shifted from the central portion of the entrance surface 24*b* of the convex lens 24 in the direction D3*b* (the left in the width direction WD in FIGS. 3A and 3B) opposite to the shift direction D3*a*.

Thus, the laser beam output from the laser diode 15 is refracted at the convex output surface 24*a* so that its optical axis L is inclined to the right in the width direction WD with respect to the optical axis CE of the convex lens 24 at the scan angle $\theta$.

The scan angle $\theta$ determines the degree of inclination of the laser beam output from the laser diode 15 with respect to the optical axis CE of the convex lens 24. In other words, the scan angle $\theta$ determines an angular scanning field of the laser beam on the right side in the width direction WD of the vehicle V. This angular scanning field of the laser beam on the right side in the width direction WD of the vehicle V will be referred to as "right angular scanning field" hereinafter.

Change of the shift position of the convex lens 24 on the right side in the width direction WD makes it possible to control the right angular scanning field $\theta$ of the laser beam in the width direction WD of the vehicle V. Similarly, change of the shift position of the convex lens 24 on the left side in the width direction WD makes it possible to control the left angular scanning field $\theta$ of the laser beam in the width direction WD of the vehicle V.

Figure 3A:
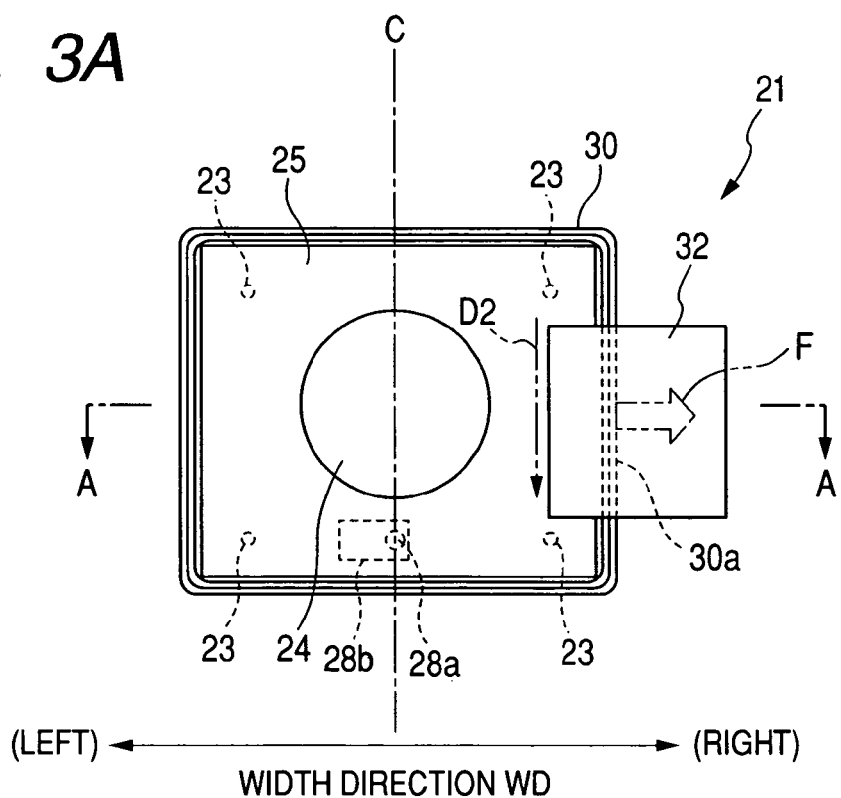
FIG. 3A is a plan view of the scanner as viewed from the forward side of the vehicle.
Figure 3B:
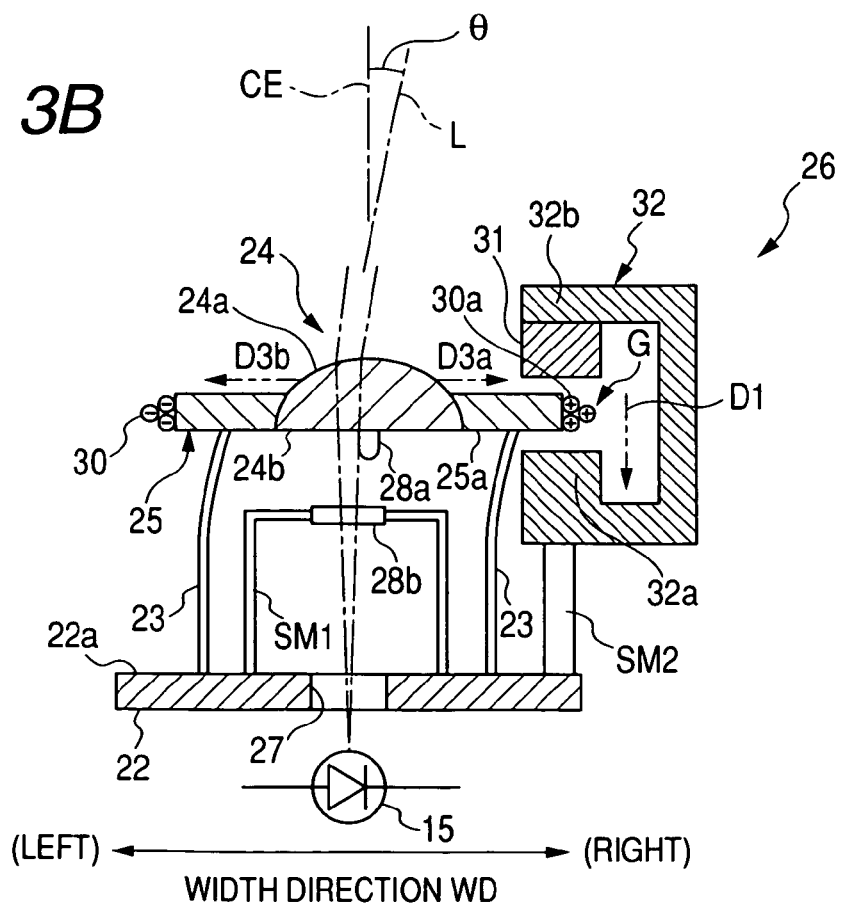
FIG. 3B is a cross sectional view taken on line A-A in FIG. 3A.

As illustrated in FIGS. 2A and 3A, the shift position of the convex lens 24 is changed with change of the position of the LED 28*a*, and the position of the emitted light to be received on the PSD 28*b* is changed depending on the change of the shift position of the convex lens 24. Thus, the PSD 28*b* works to detect the shift position of the convex lens 24 based on the received light emitted from the LED 28*a*.

The shift position (shift length and shift direction) of the convex lens 24 depends on the magnitude and direction of the electric current to be supplied to the coil 30.

Accordingly, control of the magnitude and direction of the electric current to be supplied to the coil 30 based on the shift position of the convex lens 24 detected by the PSD 28*b* in the width direction WD makes it possible to control a total angular scanning field 2 $\theta$ of the laser beam on both right and left sides in the width direction WD of the vehicle V.

Note that, in the embodiment, the right angular scanning field or the left angular scanning field will be collectively referred to as "one-side angular scanning field".

Returning to FIG. 1, the receiver 51 is provided with a collective lens 52 and a photodetector, such as a photodiode, 53.

The collective lens 52 is so arranged at the front end of the vehicle V as to receive light reflected another vehicle located in front of the vehicle V.

When the laser beam output from the scanner 21 is reflected by a target located in front of the vehicle V, light generated by reflection of the laser beam from the target is collected by the collective lens 52. The collective lens 52 and the photodetector 53 are optically coupled to each other so that the collected beam is received by the photodetector 53.

The photodetector 53 is electrically connected to the amplifier 61 and works to generate a voltage signal whose level is equivalent to the intensity of the reflected beam, and output, as a light-intensity signal, the generated voltage signal to the amplifier 61.

The amplifier 61 is electrically connected to the A/D converter 71 and is operative to amplify the light-intensity signal at a given gain, and output the amplified light-intensity signal to the A/D converter 71.

The A/D converter 71 is electrically connected to the controller 81 and is operative to convert the amplified light-intensity signal into light-intensity data in digital format, which has a digital value equivalent to the level of the amplified light-intensity signal. The A/D converter 71 is also operative to feed the light-intensity data to the controller 81.

For example, the controller 81 is designed as a computer circuit, and therefore, composed of a CPU 82, a storage unit 83, including a ROM, such as a flash ROM, and a RAM, an input/output (I/O) interface 84, and a communication interface (COM. I/F) 85. The CPU 82, the storage unit 83, the I/O interface 84, and the communication I/F 85 are communicably coupled to each other via buses B.

The I/O interface 84 is operative to interface between the CPU 82 and each of the LD driver 17, the scan actuator 26, the position detector 28, the scan actuator 41, and the A/D converter 71 so as to allow data communications therebetween.

The communication interface 85 is operative to interface between the CPU 82 and external devices including the controller 5 and the navigation system 11 so as to allow data communications therebetween.

For example, the ROM of the storage unit 83 stores therein a plurality of programs in advance. At least one of the programs causes the CPU 82 to execute the various tasks.

Figure 4:
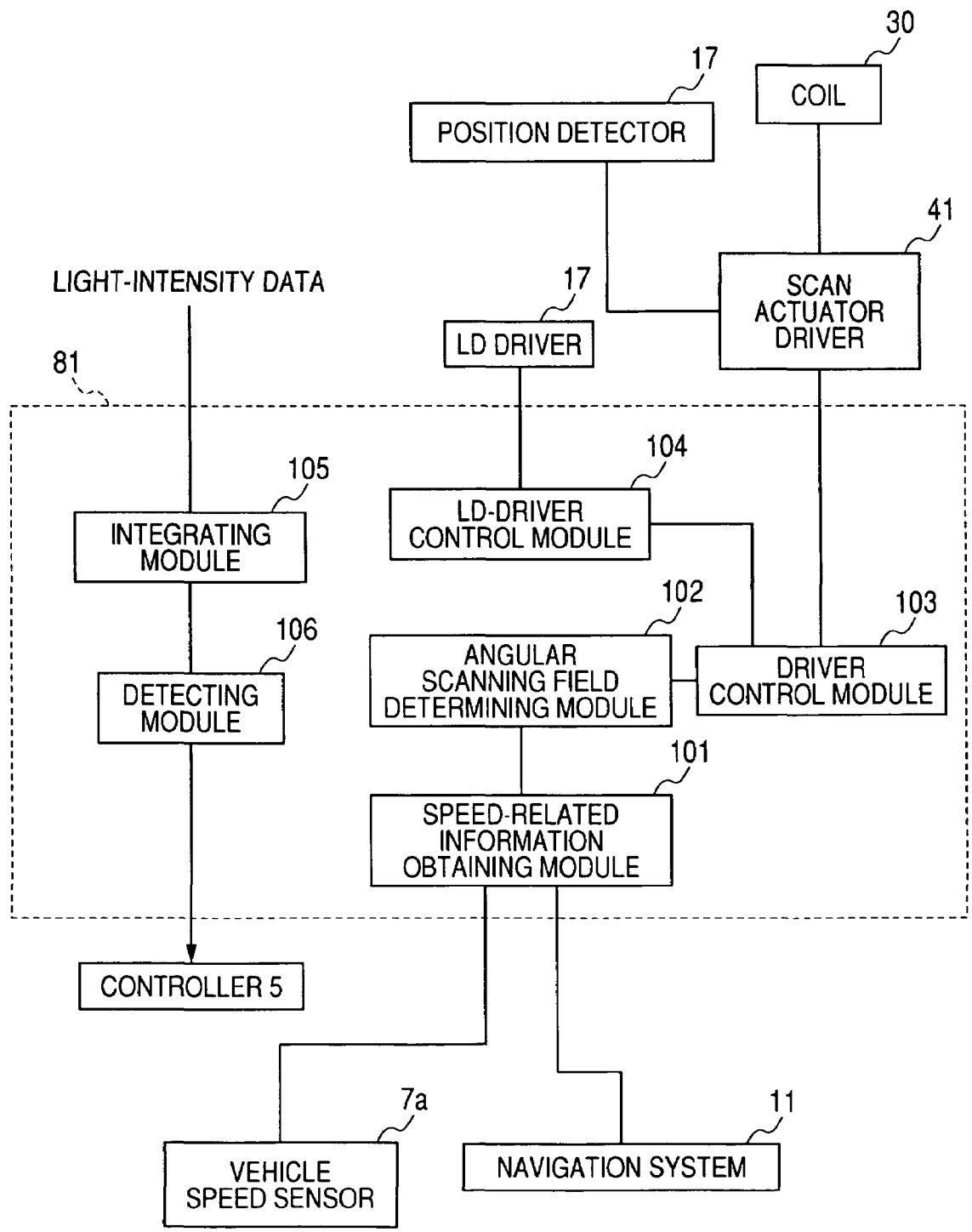
FIG. 4 is a block diagram schematically illustrating functional modules of a controller illustrated in FIG. 1.

Specifically, in the embodiment, the controller 81 (CPU 82) is designed to execute at least one of the programs stored in the ROM of the storage unit 83 while using the RAM thereof as its working memory, thus serving as a plurality of functional modules 101 to 106 illustrated in FIG. 4.

Referring to FIG. 4, the controller 81 includes, as the functional modules, a speed-related information obtaining module 101, an angular scanning field determining module 102, a driver control module 103, a LD-driver control module 104, an integrating module 105, and a detecting module 106.

The speed-related information obtaining module 101 is programmed to access the navigation system 11 and to obtain, as an item of the speed-related information, the type of a road on which the vehicle V is currently running from the navigation system 11.

The type of a road is classified into, for example, three types of "urban roads, expressways (motorways)", and "other roads". For example, a bypass road is classified into the other roads".

The speed-related information obtaining module 101 can be programmed to access the vehicle speed sensor 7a and to obtain, as another item of the speed-related information, the electric measurement signals including the speed of the vehicle V from the vehicle speed sensor 7a.

The speed-related information obtaining module 101 is programmed to pass the obtained speed-related information to the angular scanning field determining module 102.

The angular scanning field determining module 102 is programmed to:

reference information indicative of a predetermined relationship between variable pieces of the speed-related information and corresponding variable pieces of the one-side angular scanning field θ with the use of the passed piece of the speed-related information; and determine, based on the reference result, the total angular scanning field 2 θ to be scanned by the laser beam output from the laser diode 15.

Note that the relationship is practiced as a data table and/or a program.

Figures 5A, 5B, 6:
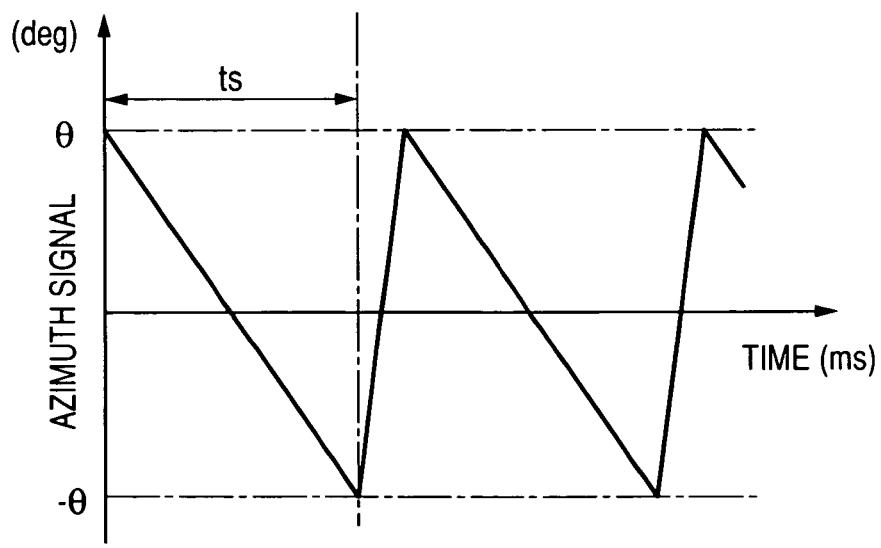
FIG. 5A is a view schematically illustrating a data table stored in a storage unit illustrated in FIG. 1.
FIG. 5B illustrates another data table stored in the storage unit illustrated in FIG. 5A.
FIG. 6 is a graph schematically illustrating discrete azimuth signals to be output from a driver control module illustrated in FIG. 4.

For example, FIG. 5A illustrates a data table T1 stored in the storage unit 83 and indicative of a predetermined relationship between variable pieces of the speed v (km/h) of the vehicle V and corresponding variable pieces of the one-side angular scanning field θ (degrees). FIG. 5B illustrates a data table T2 stored in the storage unit 83 and indicative of a predetermined relationship between variable pieces of the type of a road and corresponding variable pieces of the one-side angular scanning field θ (degrees).

As illustrated in FIG. 5A, the faster the speed v of the vehicle V becomes, the narrower the one-side angular scanning field θ becomes gradually. In other words, the slower the speed v of the vehicle V becomes, the wider the one-side scanning field θ becomes gradually. This is because the slower the speed v of the vehicle V becomes, the more the necessity to recognize targets located around the vehicle V using the total angular scanning field as wide as possible.

As illustrated in FIG. 5B, the one-side angular scanning field θ becomes narrow with change of the type of a road on which the vehicle V is running from the "urban roads" to the "expressways" via the "other roads". This is because a normal running speed of vehicles becomes faster with change of the type of a road on which the vehicle V is running in the order of the "urban roads", the "other roads", and the "expressways".

Referring to FIG. 4, the driver control module 103 is programmed to individually transmit, to the scan actuator driver 41, discrete azimuth signals over a predetermined cycle for scanning the laser beam output from the LD driver 17 over the total angular scanning field 2 θ determined by the angular scanning field determining module 102.

The scan actuator driver 41 is operative to:

determine, based on each of the individual discrete azimuth signals, a target shift direction and position of the convex lens 24 in the width direction WD required to scan the laser beam output from the LD driver 17 over the total angular scanning field 2 θ;

detect a current position of the convex lens 24 in the width direction WD based on the detection signal sent from the PSD 28b; and control the magnitude and direction of the electric current to be supplied to the coil 30 to thereby move, in the target shift direction, the convex lens 24 up to the target shift position.

The LD-driver control module 104 is programmed to apply, to the LD-driver 17, a LD drive signal in synchronization with the predetermined cycle of the discrete azimuth signals.

The LD-driver 17 is operative to drive the laser diode 15 based on the LD drive signals applied from the LD-driver control module 104 to output the pulsed laser beam over a cycle of, for example, 10 microseconds.

FIG. 6 schematically illustrates the discrete azimuth signals to be output from the driver control module 103. In FIG. 6, the discrete azimuth signals are illustrated in continuous azimuth signals for the sake of simplification.

As illustrated in FIG. 6, reference character ts represents a cycle of execution of the laser beam scanning over the total angular scanning field 2 θ in order to detect another vehicle in front of the vehicle V. The cycle ts of execution of the laser beam scanning over the total angular scanning field 2 θ is preferably determined based on control of external units, such as the controller 5 of the cruise control system 1. For example, the cycle ts of execution of the laser beam scanning over the total angular scanning field 2 θ is determined to 100 milliseconds or the like.

In FIG. 6, it is assumed that the one-side (right or left) angular scanning field θ is set to be positive, and the other-side (left or right) angular scanning field θ is set to be negative.

In this assumption, the driver control module 103 is programmed to transmit, to the scan actuator driver 41, the azimuth signals over the cycle ts, which allows the laser beam output from the LD driver 17 to be scanned from a start line at the scan angle θ made by the optical axis L of the laser beam and the optical axis CE of the convex lens 24 to an end line at which the scan angle −θ.

When the pulsed laser beam is output from the laser diode 15 every cycle of, for example, 10 microseconds so that the total angular scanning field 2 θ is scanned by the output laser beams, some of the laser beams are reflected by a target in front of the vehicle V. Light beams generated by reflection of some of the laser beams from the target are received to be converted into light-intensity signals by the receiver 51; these light-intensity signals respectively have levels equivalent to intensities of the corresponding reflected light beams.

The light-intensity signals are amplified by the amplifier 61 to be converted into items of light-intensity data by the A/D converter 71; these items of light-intensity data have digital values equivalent to the levels of the corresponding light-intensity signals. The items of light-intensity data are supplied to the controller 81.

Figure 7:
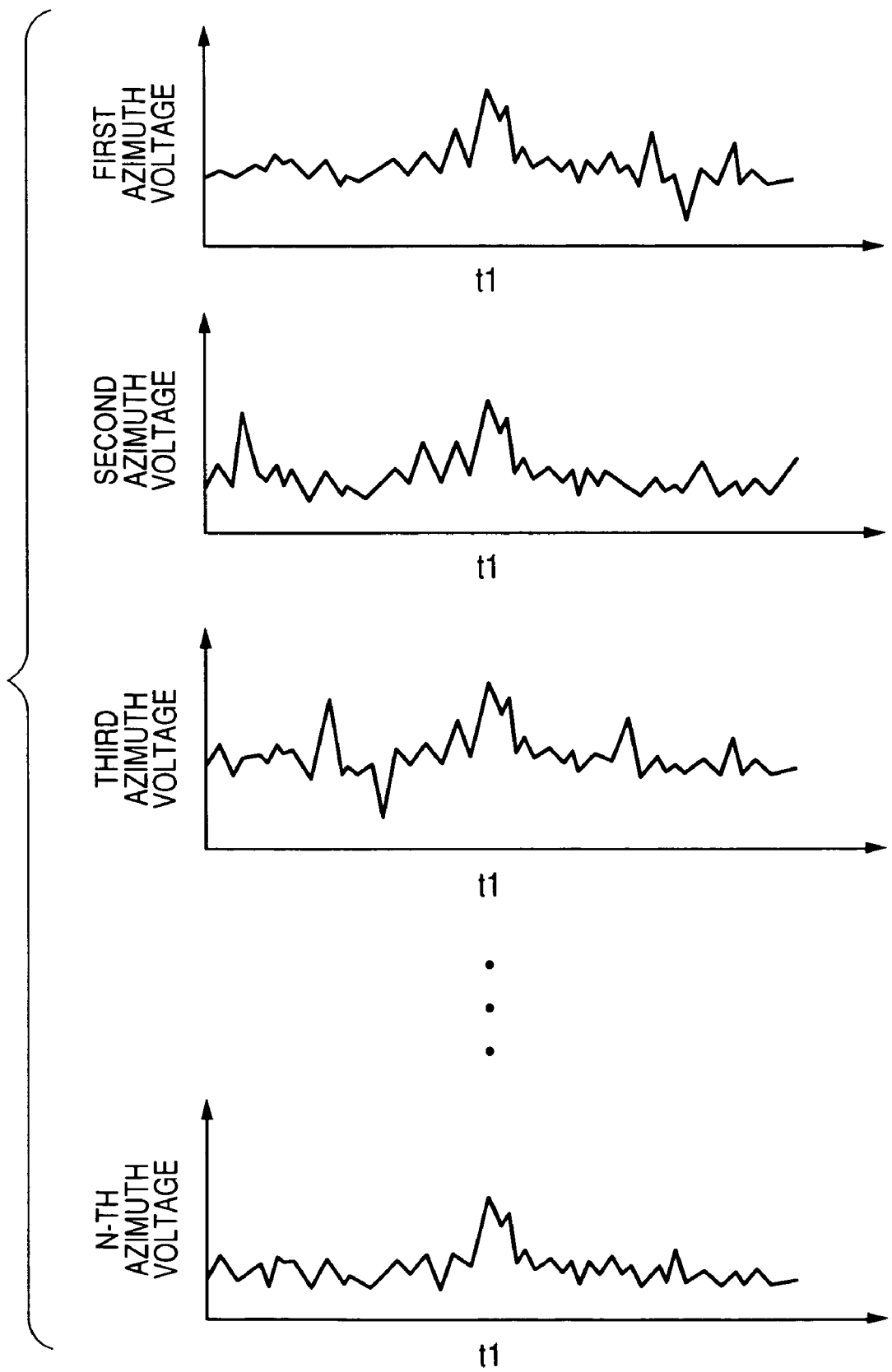
FIG. 7 are graphs schematically illustrating changes of first to N-th azimuth voltage signals over time according to the embodiment.
Figure 8:
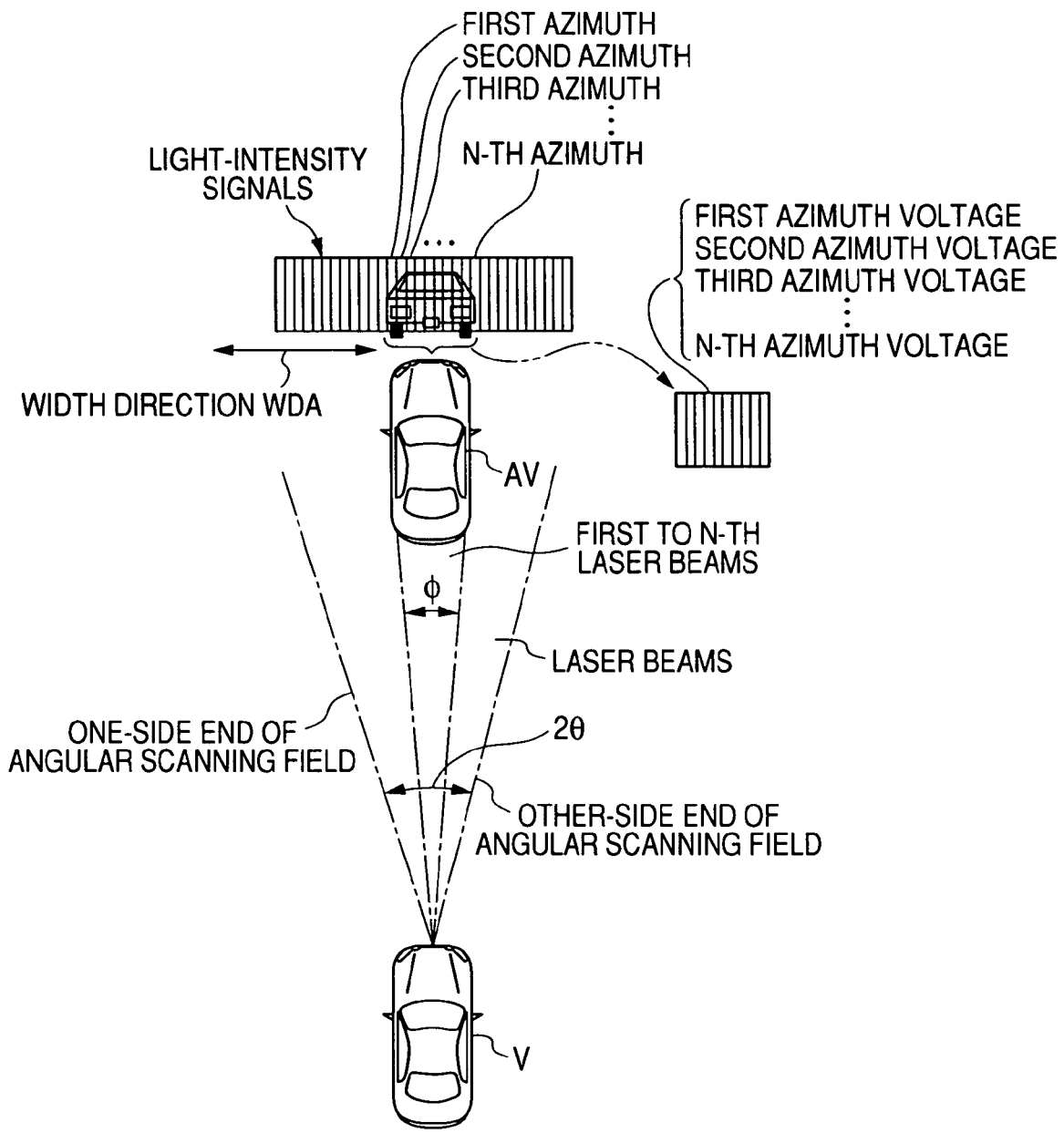
FIG. 8 is a view schematically illustrating the first to N-th azimuth voltage signals reflected from another one vehicle located in front of the vehicle according to the embodiment.

FIG. 7 schematically illustrates first to N-th (N is an integer equal to or greater than 2) azimuth voltage signals corresponding to first to N-th light-intensity signals that are supplied to the controller 81 as first to N-th items of the light-intensity data. FIG. 8 schematically illustrates the first to N-th azimuth voltage signals reflected from another one vehicle AV located in front of the vehicle as the target.

In FIGS. 7 and 8, the first to N-th azimuth voltage signals are generated based on corresponding first to N-th laser beams sequentially outputted in the first to N-th azimuths of another one vehicle AV. The first azimuth of another one vehicle AV corresponds to a direction between one-side (left-side) of the rear end of another one vehicle AV and the output point of the laser diode 15. Similarly, the N-th azimuth of another one vehicle AV corresponds to a direction between the other-side (right-side) of the rear end of another one vehicle AV and the output point of the laser diode 15.

The second to the (N−1)-th azimuths of another one vehicle AV respectively correspond to (N−2) directions between the output point of the laser diode 15 and (N−2) portions of the read end of another one vehicle V arranged in the width direction WDA thereof from the left side to the right side.

In FIG. 7, each of the first to N-th azimuth voltages is varied over time when an output time of a corresponding one of the first to N-th laser beams is set to zero time reference.

Referring to FIG. 4, the integrating module 105 is programmed to integrate, N-items by N-items, the light-intensity data over the total angular scanning field $2\theta$ and supplied to the controller 81.

Note that the N is for example determined in accordance with the following equations [1] and [2]:

$$\frac{N \times t0}{ts} = \frac{\phi}{2\theta} \quad [1]$$

$$N = \frac{(\phi \times ts)}{(t0 \times 2\theta)} \quad [2]$$

In the equations [1] and [2], as set forth above, reference characters $2\theta$ and ts respectively represent the total angular scanning field and the cycle of execution of the laser beam scanning over the total angular scanning field $2\theta$.

Reference character $\phi$ represents an integration angular range required to integrate light-intensity data.

As illustrated in FIG. 8, assuming that another vehicle (target) AV is located on a lane of a road in front of the vehicle V running on the same lane, the integration angular range $\phi$ is defined as follows:

The integration angular range $\phi$ is an angle made by a direction between one-end of another vehicle AV and the output point of the laser diode 15 and that between the other-end thereof and the output point of the laser diode 15; these one and the other ends of another vehicle AV are opposite to the vehicle V and aligned in a direction of width of the road (the same lane).

For example, in a case where a forward vehicle (target) and the vehicle V are running on the same lane of a road, the integration angular range $\phi$ corresponds to an angle made by a direction between the one-side (left-side) of the rear end of the forward vehicle and the output point laser diode 15 and that between the other-side (right-side) of the rear end thereof and the output point of the laser diode 15.

The integration angular range $\phi$ is therefore determined based on a target distance between the vehicle V and a target in front thereof and the length of the target in a direction of the width of a road on which the target is located.

In the equations [1] and [2], t0 represents the cycle of output of the pulsed laser beam from the laser diode 15.

The equations [1] and [2] show that, the narrower the total angular scanning field $2\theta$ becomes with the integration angular range $\phi$, the cycle ts, and the cycle t0 of output of the pulsed laser beam kept constant, the more the N is increased, thus increasing the number of integration of items of the light-intensity data executed by the integrating module 105.

In the embodiment, as illustrated in FIG. 5B, one-side angular scanning field $\theta$ is set to be a sufficiently narrow angle of, for example, 15 degrees or less, making it possible to increase the number of integration of items of the light-intensity data executed by the integrating module 105.

Figure 9A:
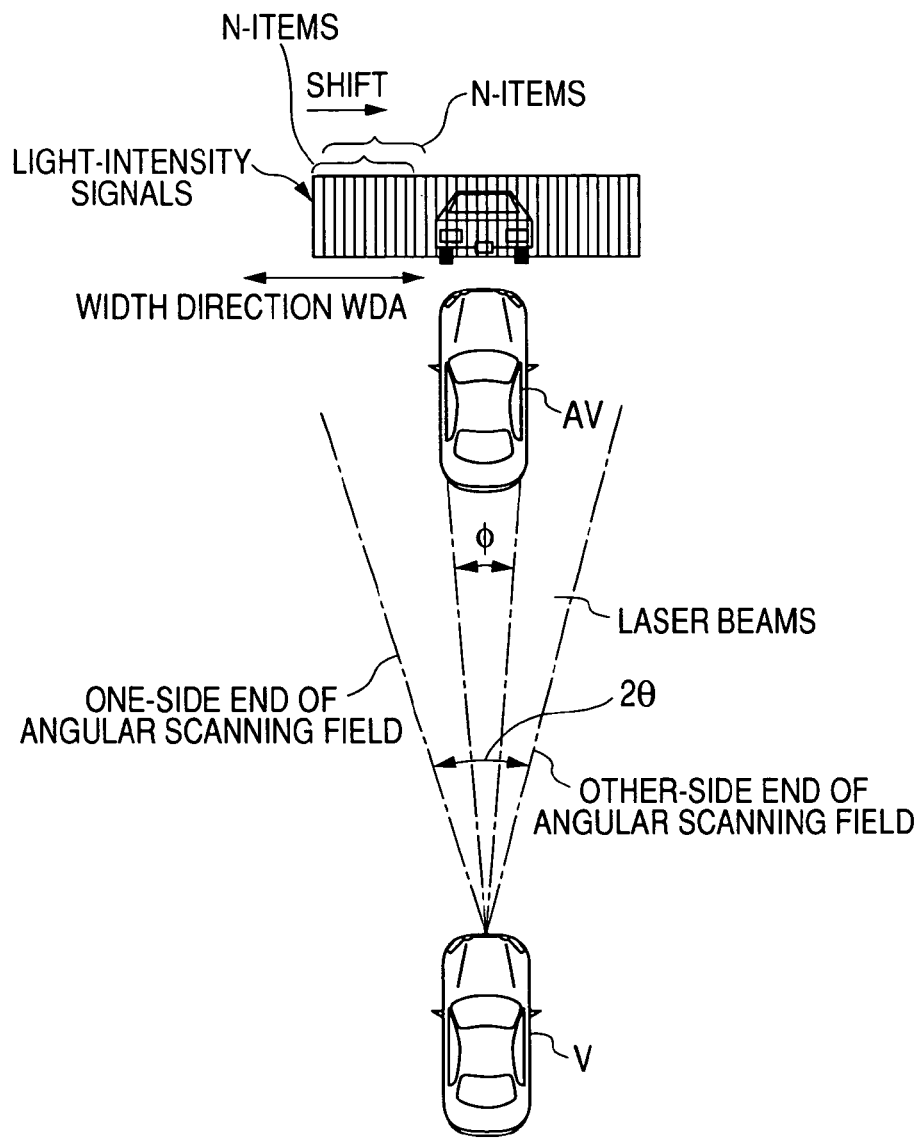
FIG. 9A is a view schematically illustrating how to integrate, N-items by N-items, light-intensity data based on the first to N-th azimuth voltage signals reflected from another one vehicle located in front of the vehicle according to the embodiment.

Specifically, as illustrated in FIG. 9A, the integrating module 105 is programmed to integrate, N-items by N-items, the light-intensity data over the total angular scanning field $2\theta$ while shifting N-items of the light intensity data to be integrated by one item or several items from the one-side (left-side) end of the total angular scanning field toward the other-side (right-side) end thereof.

Figure 9B:
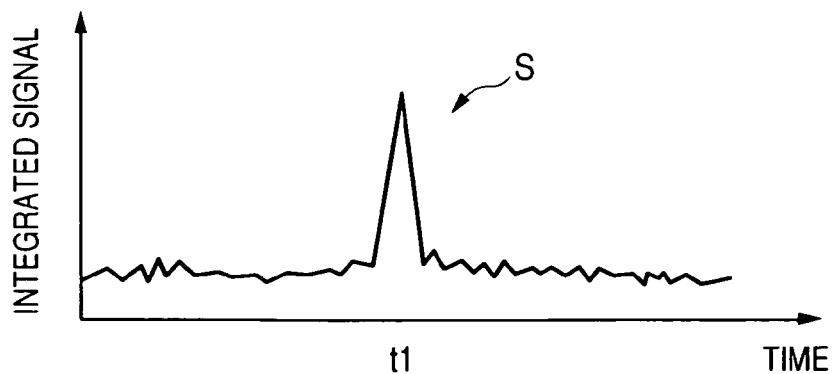
FIG. 9B is a graph schematically illustrating an integrated signal corresponding to integrated data obtained by integration of the first to N-th items of light-intensity data by an integrating module illustrated in FIG. 4.

FIG. 9B schematically illustrates an integrated signal corresponding to integrated data obtained by integration of the first to N-th items of light-intensity data by the integrating module 105.

As illustrated in FIGS. 7 and 9, a reflection component of each of the first to N-th voltages (light-intensity signals) generated by reflection of a corresponding one the first to N-th laser beams output toward the target (another one vehicle AV) appears when the same time t1 has elapsed since the zero time reference of a corresponding one of the first to N-th laser beams.

In contrast, noise components contained in each of the first to N-th voltages (light-intensity signals) due to several factors randomly appear therein.

For these reasons, as illustrated in FIG. 9, a reflection component S of the integrated signal corresponding to the integration of the reflection component of each of the first to N-th voltages is amplified relatively greater in level than the noise components. This enables the S/N (signal-to-noise) ratio of the integrated signal to increase.

The detecting module 106 is programmed to determine whether at least one of the digital values of the integrated data exceeds a predetermined threshold value V0 corresponding to a predetermined voltage level. Because the threshold value V0 is predetermined to be sufficiently lower than the digital value corresponding to the reflection component S of the integrated data, the detecting module 106 is programmed to determine that the digital value corresponding to the reflection component S of the integrated data exceeds the threshold value V0. Then, the detecting module 106 is programmed to determine that there is a target in front of the vehicle V and to output an electrical signal indicative of the detected target to the controller 5.

When determining that a target exists in front of the vehicle V, the detecting module 106 is programmed to determine the time t1 corresponding to the digital value equivalent to the reflection component S of the integrated data.

Figure 10:
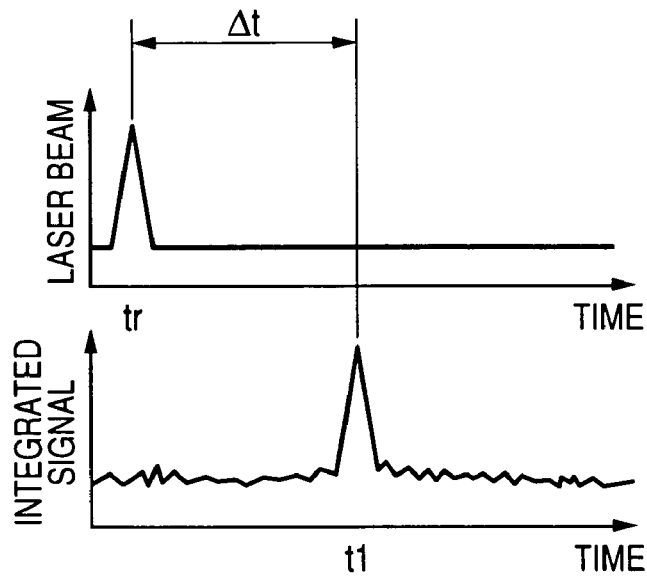
FIG. 10 are graphs schematically illustrating changes of a laser beam and the integrated signal over time according to the embodiment.

The detecting module 106 is programmed to compute a difference between the time t1 and the output time tr of each of the first to N-th laser beams and to compute a distance between the vehicle V and another vehicle AV based on the computed time difference (see FIG. 10). Thereafter, the detecting module 106 is programmed to output an electrical signal indicative of the computed distance to the controller 5.

As described above, the radar device 3 is configured to swing the convex lens 24 relative to the laser diode 15 in, for example, the width direction WD of the vehicle V so as to change the direction of the laser beam output from the laser diode 15.

As compared with change of the direction of a laser beam by rotation of a polygon mirror, the configuration of the radar device 3 enables the angular scanning field to be more narrowed.

The radar device 3 is also configured to integrate, N-items by N-items, the light-intensity data corresponding to the light-intensity signals obtained by scanning the laser beam over the total angular scanning field 2 θ.

The configuration allows the reflection component of each of the first to N-th light-intensity signals from the target to be amplified greater in level than noise components contained therein due to several factors because the noise components randomly appear in each of the first to N-th light-intensity signals. This makes it possible to obtain the integrated signal with high S/N ratio.

In the radar device 3 according to the embodiment, the total angular scanning field can be set to be narrower than the conventional one obtained by changing the direction of a laser beam by rotation of a polygon mirror.

When the integration angular range φ is set to be the same range as the conventional structure, it is possible to increase the number of integration of items of the light-intensity data, thus more increasing the S/N ratio of the integrated signal. Otherwise when the number of integration of items of the light-intensity data is set to be the same number as the conventional structure, the integration angular range φ can be set to be narrower than the conventional one, making it possible to improve the target detecting resolution of the radar device 3.

The radar device 3 can be configured such that, the slower the speed v of the vehicle V becomes, the wider the one-side angular scanning field θ becomes gradually. This makes it possible to, even under conditions in which it is necessary to check targets in a wide angular scanning rage, such as a vehicle-speed slow condition, detect the targets located in such a wide angular scanning field.

In the radar device 3, the more the type of a road on which the vehicle V is running is changed with reduction of a normal running speed, the wider the one-side angular scanning field θ becomes. This makes it possible to, even under conditions in which it is necessary to check targets in a wide angular scanning rage, such as the road type condition changed with reduction of a normal running speed, to detect the targets located in such a wide angular scanning field.

In the embodiment, the scanner 21 is configured to swing the convex lens 24 in the width direction WD of the vehicle V relative to the laser diode 15 so as to change the direction of the laser beam output from the laser diode 15, but the present invention is not limited to the structure.

Figure 11:
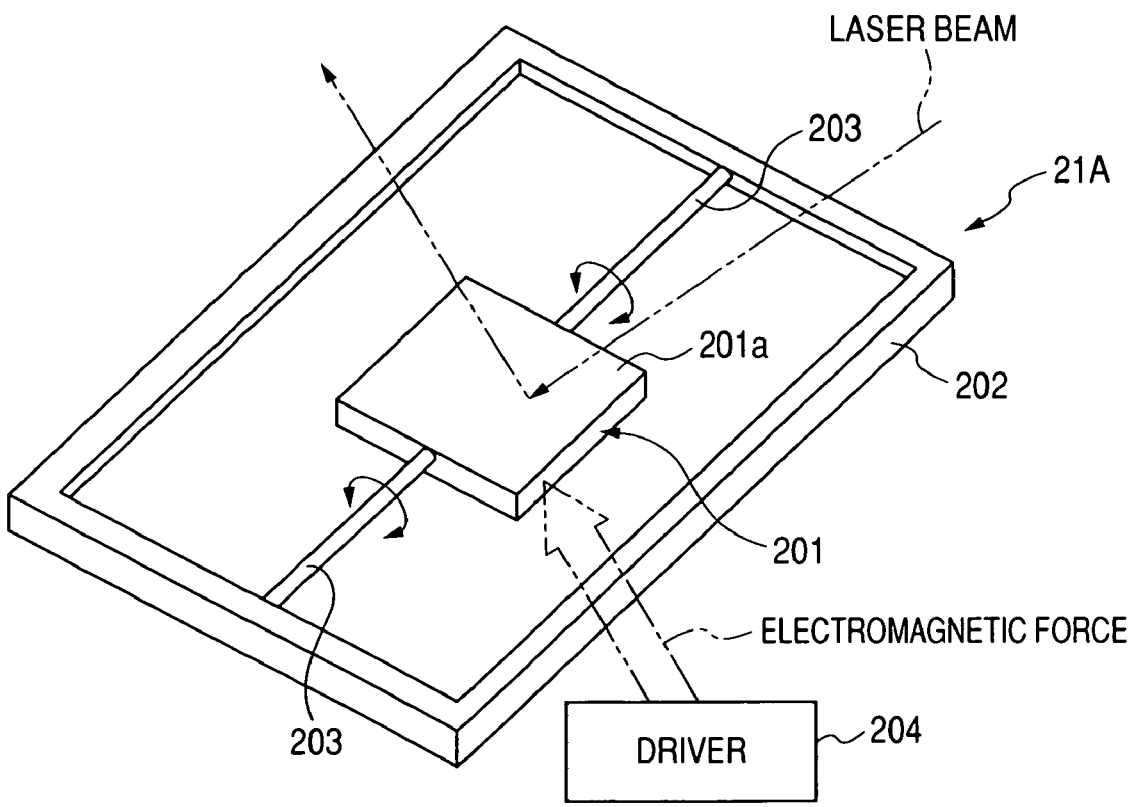
FIG. 11 is a view schematically illustrating an example of the structure of a scanner according to a modification of the embodiment.

Specifically, as illustrated in FIG. 11, a scanner 21A is provided with a mirror 201 with a plate-like shape, a rectangular annular frame 202 surrounding the mirror 201 with a gap therearound, and at least a pair of torsion bar springs 203. One of the torsion bar springs 203 is linked between one side of the mirror 201 with and a corresponding one inner wall of the frame 202. Similarly, the other of the torsion bar springs 203 is linked between one side of the mirror 201 with and a corresponding one inner wall of the frame 202.

A reflector 201a of the mirror 201 is arranged opposing the laser diode 15 such that the laser beam output therefrom can be entered to the reflector 201a.

The scanner 21A is provided with a driver 204. The driver 204 is configured to apply electromagnetic force, such as Lorentz force, to the mirror 201 so as to swing it about the paired torsion bar springs 203 while they are twisted. The swing of the mirror 201 (reflector 201a) allows the direction of the laser beam output from the laser diode 15 to be changed (see FIG. 11), and therefore, the same effects as the embodiment can be obtained.

In the embodiment, the angular scanning field determining module 102 is programmed to determine the total angular scanning field based on the speed-related information, but it can be programmed to determine the total angular scanning field based on the width of a lane of a road on which the vehicle V is running.

Figures 12, 13:
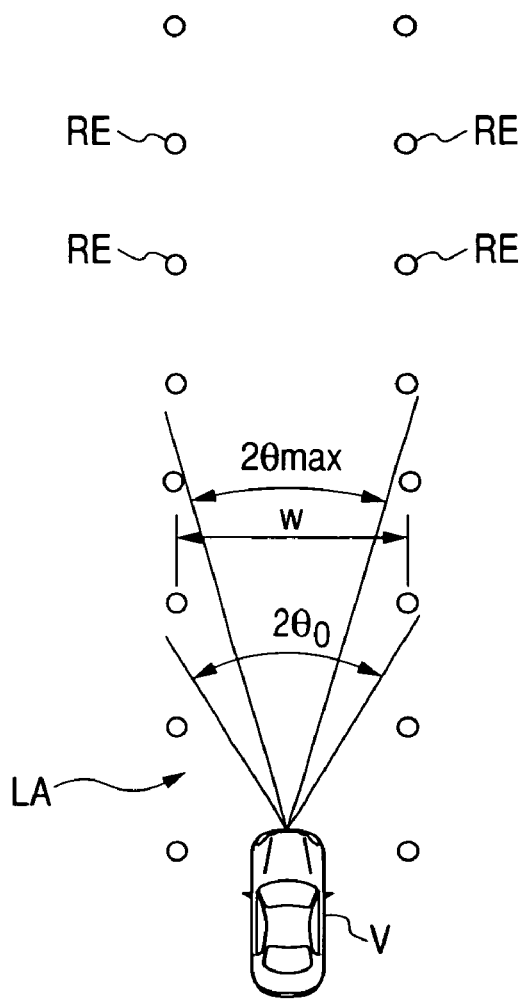
FIG. 12 is a view schematically illustrating a data table stored in the storage unit illustrated in FIG. 1.
FIG. 13 is a view schematically illustrating how to obtain the width of a lane according to another modification of the embodiment.

FIG. 12 illustrates a data table T3 stored in the storage unit 83 and indicative of a predetermined relationship between variable pieces of the width w of a lane on which the vehicle V is running and corresponding variable pieces of the one-side angular scanning field θ (degrees).

As illustrated in FIG. 12, when the wide of a lane on which the vehicle V is running is wider than a predetermined lane width, such as 10 m, the one-side angular scanning field θ is changed to become wide from 8 degrees to 15 degrees.

Specifically, in this modification, it is possible to wide the total angular scanning field for detecting targets depending on increase of the width of a lane on which the vehicle is running.

The angular scanning field determining module 102 can obtain information indicative of the width of a lane on which the vehicle V is running from the navigation system 11 when the navigation system 11 stores at its electronic map database the widths of roads to be run by the vehicle V.

In addition, when the sensors 7 include an in-vehicle camera installed in the vehicle V for taking images around the vehicle V, such as images of road-partitioning members located at both sides of the vehicle V on roads, such as lane markings and/or reflectors of roads, the angular scanning field determining module 102 can obtain information indicative of the width of a lane on which the vehicle V is running based on the images around the vehicle V taken by the in-vehicle camera.

In obtaining information indicative of the width of a lane on which the vehicle V is running, the angular scanning field determining module 102 can obtain the width of the lane using the light-intensity signals corresponding to the laser beams output from the laser diode 15.

As illustrated in FIG. 13, reflectors RE are aligned in a row on each side of a lane LA on which the vehicle V is running.

In this situation, the angular scanning field determining module 102 can be programmed to scan, at predetermined intervals of, for example, 10 seconds, the laser beam over a total angular scanning filed 2 θ0 wider than the minimum total angular scanning field $θ_{min}$ determined by the angular scanning field determining module 102, such as (2×15) degrees as an example in the embodiment.

The angular scanning field determining module 102 can be programmed to determine the width w of a lane on which the vehicle V is running based on data obtained by the scan. This is because components of the light-intensity signals corresponding to the reflectors RE are higher in level than the remaining components thereof.

In the embodiment, the radar device 3 is mounted on the front end of the vehicle V for detecting forward vehicles located in front of the vehicle V, but the present invention is not limited to the structure.

Specifically, the radar device 3 can be mounted on at least one of the front end, the rear end, the right side end, and the left end of the vehicle V for detecting targets around the vehicle V based on the total angular scanning field therearound.

The information indicative of the width of a lane (road) on which the vehicle V is running can be obtained from a VICS® (Vehicle Information and Communication System) center via, for example, beacons installed on roadsides.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A radar device installed in a vehicle for detecting a target around the vehicle, the radar device comprising:
    a transmitter that transmits a plurality of radio signals at intervals;
    a scanning mechanism arranged such that each of the plurality of radio signals is individually entered thereto, the scanning mechanism being swingable relative to the transmitter to change a direction of each of the plurality of radio signals entered thereto, thus scanning each of the plurality of radio signals over an angular scanning field, the angular scanning field being located around the vehicle; and
    a receiver that receives a plurality of reflected signals to detect intensities of the plurality of received reflected signals, at least some of the plurality of reflected signals being generated based on reflection of at least some of the plurality of radio signals from the target;
    wherein the scanning mechanism comprises:
    a swinging unit that swings the scanner mechanism to a swung position for individually each of the plurality of radio signals entered to the scanner mechanism, the swung position for individually each of the plurality of radio signals being required to scan the angular scanning field;
    an integrating unit that integrates the at least some of the plurality of reflected signals to obtain an integrated signal, the at least some of the plurality of radio signals being transmitted to be adjacent to each other via the scanning mechanism within a predetermined integration angular range contained in the angular scanning field; and
    a detector that compares an intensity of the integrated signal with a predetermined threshold intensity to detect the target based on the comparison result.

2. A radar device according to claim 1, further comprising:
    a speed-related information obtaining unit that obtains information related to a speed of the vehicle,
    wherein the swinging unit is configured to adjust the swung position for individually each of the plurality of radio signals entered to the scanner mechanism so that, the slower the speed of the vehicle of the obtained information is, the wider the angular scanning field.

3. A radar device according to claim 2, wherein the information obtained by the speed-related information obtaining unit includes the speed of the vehicle itself.

4. A radar device according to claim 2, wherein the information obtained by the speed-related information obtaining unit includes a type of a lane of a road on which the vehicle is running.

5. A radar device according to claim 1, further comprising:
    a lane width obtaining unit configured to obtain a width of a lane of a road on which the vehicle is running,
    wherein the swinging unit is configured to adjust the swung position for individually each of the plurality of radio signals entered to the scanner mechanism so that, the wider the width of the lane of the road on which the vehicle is running is, the wider the angular scanning field.

6. A radar device installed in a vehicle for detecting a target around the vehicle, the radar device comprising:
    a transmitter that transmits a plurality of radio signals at intervals;
    a scanning mechanism arranged such that each of the plurality of radio signals is individually entered thereto, the scanning mechanism being swingable relative to the transmitter to change a direction of each of the plurality of radio signals entered thereto, thus scanning each of the plurality of radio signals over an angular scanning field, the angular scanning field being located around the vehicle; and
    a receiver that receives a plurality of reflected signals to detect intensities of the plurality of received reflected signals, at least some of the plurality of reflected signals being generated based on reflection of at least some of the plurality of radio signals from the target;
    wherein the scanning mechanism comprises:
    a swinging unit that swings the scanner mechanism to a swung position for individually each of the plurality of radio signals entered to the scanner mechanism, the swung position for individually each of the plurality of radio signals being required to scan the angular scanning field;
    an integrating unit that integrates the at least some of the plurality of reflected signals to obtain an integrated signal, the at least some of the plurality of radio signals having a constant number and being transmitted to be adjacent to each other via the scanning mechanism; and
    a detector that compares an intensity of the integrated signal with a predetermined threshold intensity to detect the target based on the comparison result.

7. A radar device according to claim 6, further comprising:
    a speed-related information obtaining unit that obtains information related to a speed of the vehicle,
    wherein the swinging unit is configured to adjust the swung position for individually each of the plurality of radio signals entered to the scanner mechanism so that, the slower the speed of the vehicle of the obtained information is, the wider the angular scanning field.

8. A radar device according to claim 7, wherein the information obtained by the speed-related information obtaining unit includes the speed of the vehicle itself.

9. A radar device according to claim 7, wherein the information obtained by the speed-related information obtaining unit includes a type of a lane of a road on which the vehicle is running.

10. A radar device according to claim 6, further comprising:
    a lane width obtaining unit configured to obtain a width of a lane of a road on which the vehicle is running,
    wherein the swinging unit is configured to adjust the swung position for individually each of the plurality of radio signals entered to the scanner mechanism so that, the wider the width of the lane of the road on which the vehicle is running is, the wider the angular scanning field.

11. A radar device installed in a vehicle for detecting a target around the vehicle, the radar device comprising:

a transmitter that transmits a plurality of radio signals at intervals;

a scanning mechanism arranged such that each of the plurality of radio signals is individually entered thereto, the scanning mechanism being swingable relative to the transmitter to change a direction of each of the plurality of radio signals entered thereto, thus scanning each of the plurality of radio signals over an angular scanning field, the angular scanning field being located around the vehicle; and a receiver that receives a plurality of reflected signals to detect intensities of the plurality of received reflected signals, at least some of the plurality of reflected signals being generated based on reflection of at least some of the plurality of radio signals from the target;

wherein the scanning mechanism comprises:

a biasing member that biases the lens toward a default position predetermined depending on a positional relationship between the lens and the transmitter, wherein the swinging unit is configured to shift the biasing member from the default position in a predetermined swinging direction.

12. A radar device according to claim 11, wherein the predetermined swinging direction is in parallel to a direction of width of the vehicle.

* * * * *